US012561864B2

(12) United States Patent
Sipolins et al.

(10) Patent No.: US 12,561,864 B2
(45) Date of Patent: Feb. 24, 2026

(54) ACCELERATION-BASED SCREEN EFFECTS TO PREVENT VEHICLE PASSENGER MOTION SICKNESS

(71) Applicant: Adeia Guides Inc., San Jose, CA (US)

(72) Inventors: Aldis Sipolins, Somerville, MA (US); Dhananjay Lal, Englewood, CO (US); Ning Xu, Irvine, CA (US)

(73) Assignee: Adeia Guides Inc., San Jose, CA (US)

( * ) Notice: Subject to any disclaimer, the term of this patent is extended or adjusted under 35 U.S.C. 154(b) by 215 days.

(21) Appl. No.: 18/374,359

(22) Filed: Sep. 28, 2023

(65) Prior Publication Data

US 2025/0111562 A1 Apr. 3, 2025

(51) Int. Cl.
| | |
|---|---|
| *G06T 11/60* | (2006.01) |
| *G06F 3/01* | (2006.01) |
| *G06T 11/00* | (2006.01) |
| *G06T 13/20* | (2011.01) |
| *G06T 13/80* | (2011.01) |

(52) U.S. Cl.
CPC .............. *G06T 11/60* (2013.01); *G06F 3/012* (2013.01); *G06F 3/013* (2013.01); *G06T 11/001* (2013.01); *G06T 13/20* (2013.01); *G06T 13/80* (2013.01)

(58) Field of Classification Search
CPC ...................................................... G06T 11/60
See application file for complete search history.

(56) References Cited

U.S. PATENT DOCUMENTS

2020/0189466 A1* 6/2020 Askeland ............. H04N 9/3185
2025/0111612 A1* 4/2025 Jeannin ................... G06F 1/163

OTHER PUBLICATIONS

"Bosch OBD devices", Bosch, Retrieved from URL: https://www.boschdiagnostics.com/products/bosch-obd-1150, 2025, 2 Pages.
"CarSensors," Developers Android for Cars API documentation, Retrieved from URL: https://developer.android.com/reference/androidx/car/app/hardware/info/CarSensors, retrieved on Jul. 30, 2025, 6 pages.
Hanau E., et al., "MotionReader: Visual Acceleration Cues for Alleviating Passenger E-Reader Motion Sickness", AutomotiveUI '17: Proceedings of the 9th International Conference on Automotive User Interfaces and Interactive Vehicular Applications Adjunct, Sep. 24, 2017, 8 pages.

(Continued)

*Primary Examiner* — Shivang I Patel
(74) *Attorney, Agent, or Firm* — HG LAW LLP

(57) ABSTRACT

The present disclosure is directed to systems and methods for reducing or preventing motion sickness using an animated overlay displayed over a content item and reflecting a detected acceleration. In some embodiments the systems and methods generate for display, on a device, a content item. The systems and methods determine an acceleration of the device along a vector, where the vector comprises a vector component that is normal to a plane defined by the display of the content item. The systems and methods then generate for display a graphical overlay over the display of the content item, wherein the graphical overlay is animated to appear to move in a direction defined by the vector comprising the vector component that is normal to the plane defined by the display.

20 Claims, 11 Drawing Sheets

(56) References Cited

OTHER PUBLICATIONS

Islam. R. et al., "Automatic detection of cybersickness from physiological signal in a virtual roller coaster simulation," IEEE conference on virtual reality and 3D user interfaces abstracts and workshops (VRW). Mar. 22-26, 2020, pp. 648-649.

Meschtscherjakov A., et al., "Bubble Margin: Motion Sickness Prevention While Reading on Smartphones in Vehicles", HAL Open Science, 17th IFIP Conference on Human Computer Interaction (INTERACT), Aug. 25, 2019, 19 pages.

Meta, "Meta and BMW: Taking AR and VR Experiences on the Road",(https://about.fb.com/news/2023/05/meta-bmw-ar-vr-experiences/), (May 17, 2023), 7 pages.

* cited by examiner

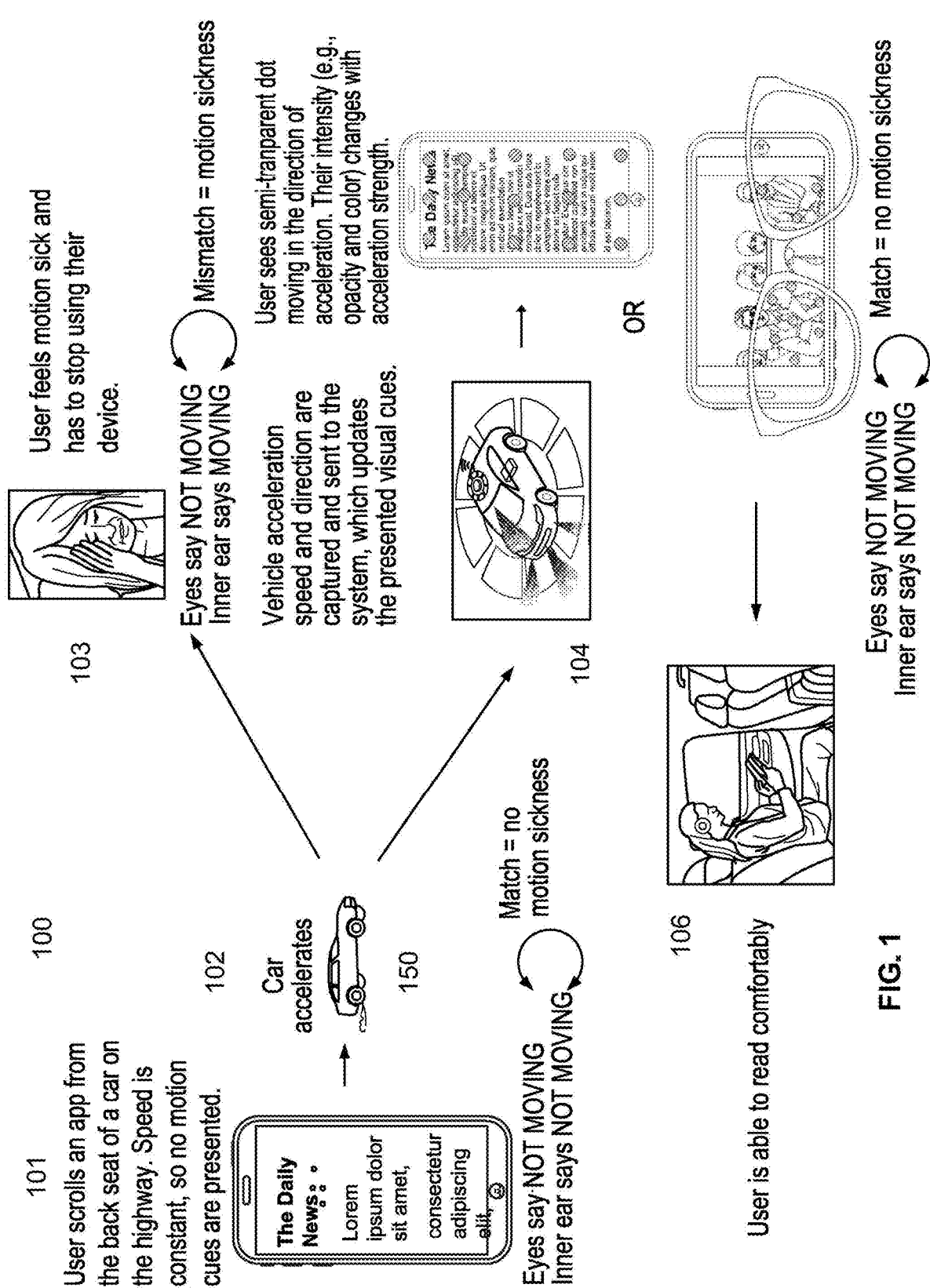

101

User scrolls an app from the back seat of a car on the highway. Speed is constant, so no motion cues are presented.

100

102

Car accelerates

150

Eyes say NOT MOVING Inner ear says NOT MOVING

Eyes say NOT MOVING Inner ear says MOVING

Mismatch = motion sickness

User feels motion sick and has to stop using their device.

103

User sees semi-tranparent dot moving in the direction of acceleration. Their intensity (e.g., opacity and color) changes with acceleration strength.

Vehicle acceleration speed and direction are captured and sent to the system, which updates the presented visual cues.

104

Match = no motion sickness

OR

Eyes say NOT MOVING Inner ear says NOT MOVING

Match = no motion sickness

106

User is able to read comfortably

FIG. 1

201
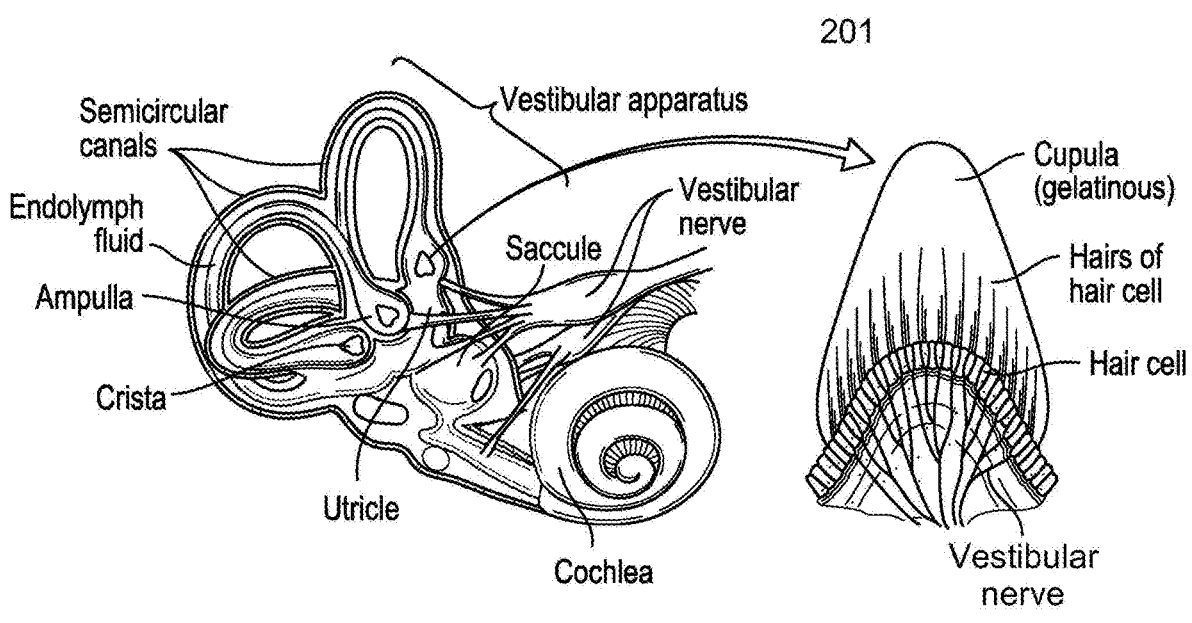
Semicircular canals
Endolymph fluid
Ampulla
Crista
Utricle
Vestibular apparatus
Saccule
Vestibular nerve
Cochlea
Cupula (gelatinous)
Hairs of hair cell
Hair cell
Vestibular nerve
FIG. 2A
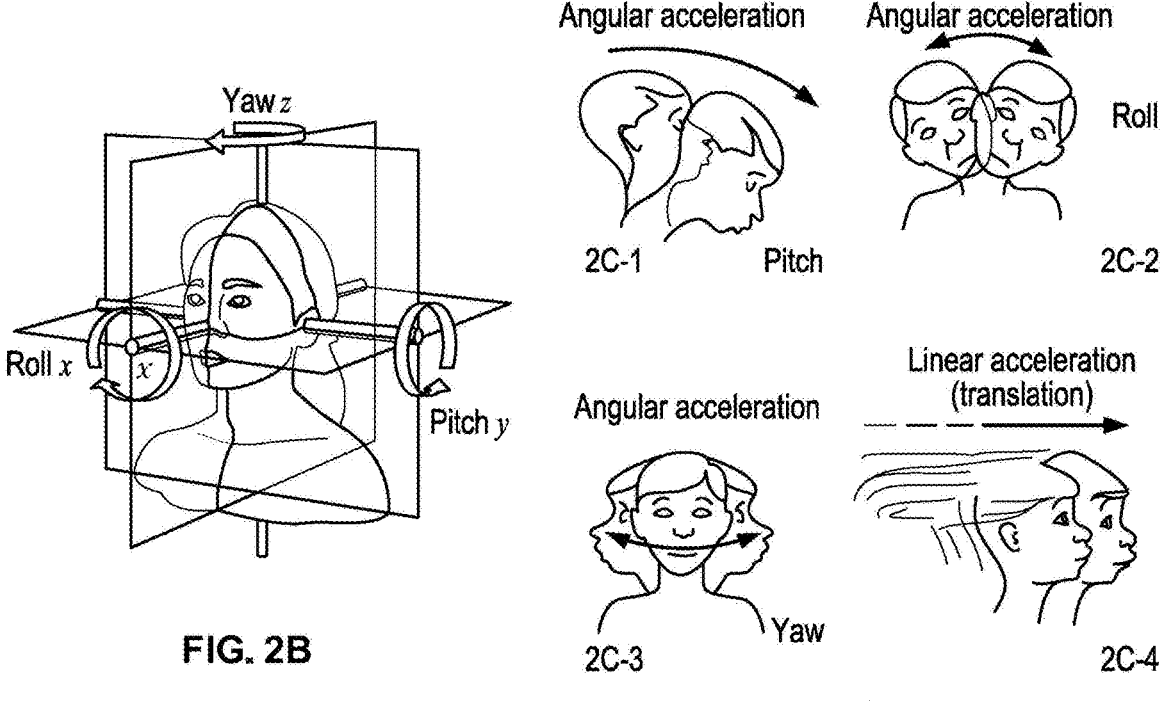
Yaw z
Roll x
Pitch y
Angular acceleration
2C-1          Pitch
Angular acceleration
Roll
2C-2
Angular acceleration
2C-3          Yaw
Linear acceleration (translation)
2C-4
FIG. 2B
FIG. 2C

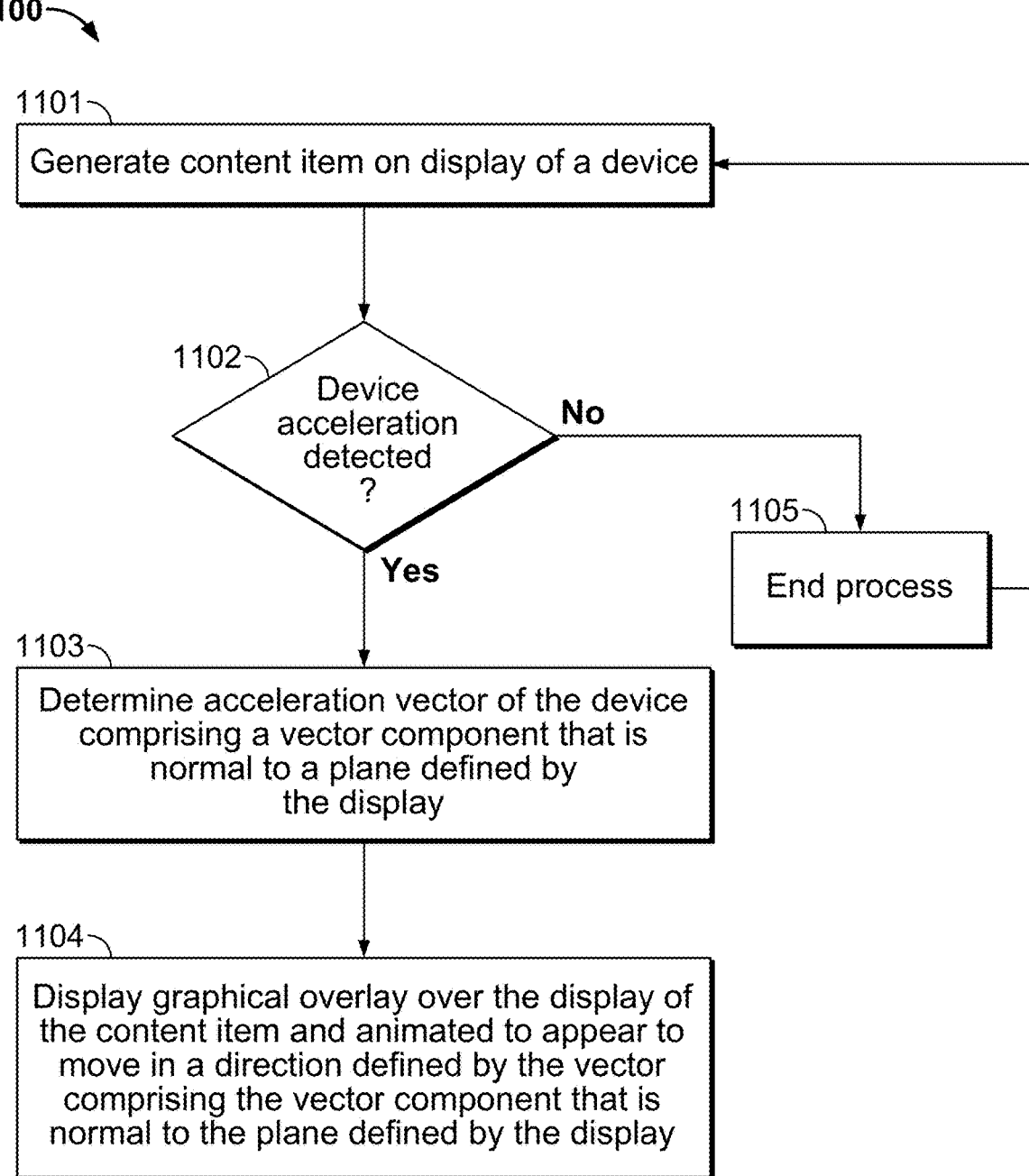

1100

1101
Generate content item on display of a device

1102
Device acceleration detected ?

No

Yes

1105
End process

1103
Determine acceleration vector of the device comprising a vector component that is normal to a plane defined by the display 1104
Display graphical overlay over the display of the content item and animated to appear to move in a direction defined by the vector comprising the vector component that is normal to the plane defined by the display

FIG. 11

ACCELERATION-BASED SCREEN EFFECTS TO PREVENT VEHICLE PASSENGER MOTION SICKNESS

BACKGROUND

The present system is related to systems and techniques using an animated overlay on a visual display to reduce symptoms of motion sickness.

SUMMARY

The present disclosure relates to displaying an overlay effect on the screen of a device to reduce symptoms of motion sickness. The overlay may include semitransparent images that appear to move in a direction consistent with detected acceleration. The device itself may display the overlay in some embodiments. In some embodiments, a second device, such as an XR device, displays the overlay.

Motion sickness is often the result of the brain receiving conflicting information regarding acceleration. For example, a passenger who is reading in a moving vehicle will sense acceleration through his or her vestibular system, or the inner ear, as the vehicle accelerates. However, that same passenger's vision will indicate that the passenger is not accelerating because the passenger is looking at a still screen. The conflicting information causes the individual to experience motion sickness. The experience of motion sickness, including nausea, headaches, and dizziness, often prevents device use inside moving vehicles.

In one approach, a 2D visual cue that reacts to detected acceleration is added to a screen of a device. For example, the visual cue may be a ball and spring animation that moves in two dimensions along the plane of a screen in reaction to the detected acceleration. In another example, the text of the device may move along the plane of a screen in reaction to the acceleration. In another example, an animated border around the perimeter of a screen reacts to the detected acceleration by movement in two dimensions along the plane of a screen. Each of these adjustments produce movement on a screen that attempts to mimic the acceleration a vestibular system experiences in an attempt to avoid conflict between senses and therefore motion sickness.

However such approaches require dedicated screen space which limits the area available for other content. Further, such approaches often only indicate movement or acceleration in one or two dimensions (e.g., the horizontal and vertical axes of the screen). In reality, passengers and other users most often detect acceleration in a direction that includes a component normal (i.e., perpendicular) to the screen and this direction, the direction normal to the screen, is a key component of acceleration. In other words, while the plane of a screen or display includes only two dimensions, passengers sense movement and acceleration in three dimensions. In many cases, sensed acceleration includes a component normal to the plane of the of the screen surface. For example, when a vehicle accelerates forward, a passenger looking at a screen held up to her face may sense acceleration in a direction into the screen. As a result, approaches that depict motion by simply moving graphical objects along one or two dimensions of the screen surface, for example, may fail to visually signal to the user the most significant component of movement or acceleration felt by the user: the component normal to the screen surface. Because such approaches reduce visual acceleration to two dimensions along the plane of the display and omit the third dimension, they cannot effectively mitigate motion sickness resulting from acceleration with a component normal to the plane of the display.

The present disclosure describes systems and techniques for alleviating symptoms of motion sickness by displaying a three-dimensional (3D) overlay effect on a device screen. Unlike some approaches, the described techniques may visually signal motion or acceleration in any of three dimensions. The described techniques may be implemented without requiring excessive or dedicated use of screen space. In some embodiments the effect is a two-dimensional animation that appears three-dimensional. In some embodiments, the systems and techniques monitor acceleration of a device (e.g., a device within a vehicle) and produce an overlay on a screen showing semitransparent figures, such as balls, or small solid figures or lines that react to the detected acceleration in a matter designed to appear to have three-dimensional motion. The objects (e.g., balls) may at the same time change in size and distance from one another to create an effect of acceleration normal to the screen (e.g., by way of providing an illusion that the objects or getting closer to, or farther away from, the user). In some embodiments, the change in size and distance are selected to create an appearance of acceleration in a direction normal to the plane of the screen, (e.g., with magnitude that is proportional to monitored acceleration of the device). In one example, transparent balls on a screen may move left, right, up, and down in addition to changes in size and distance from one another as the device detects acceleration. In one example, the effect includes transparent figures arranged in a grid pattern.

In one approach, a series of concentric circles are displayed on the screen which move according to detected acceleration and create a tunnel effect mirroring acceleration normal to the plane of the screen as the device detects acceleration. The tunnel effect may create an illusion of motion into or out of the tunnel, visually signaling motion or acceleration into or out of the depicted tunnel. In one approach a tunnel effect includes a vanishing point with a location on the screen determined by the detected acceleration. The vanishing point may visually signal to the user a point in the distance she is approaching or from which she is moving away. In one example the location may change dynamically with detected acceleration. In one approach the tunnel effect includes a series of synchronized and concentric circles wherein each circle is in the foreground of the circle it encapsulates. In some approaches, as the device detects acceleration, an effect further includes movements vertical and horizontal relative to the display. In one approach the systems and methods track the head or eye gaze of a user and align the effect with the user's view of the display of the device. In one approach the effect is animated in a color contrasting the dominant or average color of the display of the device. In one approach, the overlay is cast on top of the display of the device via an XR display.

These effects of the overlay give a visual cue of perceived acceleration normal to the display, and when coupled with horizontal and vertical movements, account for acceleration in all three dimensions. These cues align with information the vestibular system reports, for example by displaying an animation moving with equal and opposite acceleration, thereby reducing or preventing motion sickness without sacrificing screen space.

BRIEF DESCRIPTION OF THE DRAWINGS

FIG. 1 shows an example process in accordance with some embodiments of the present disclosure;

FIG. 2A shows an example anatomy of the vestibular system;

FIG. 2B shows example directions of acceleration in accordance with some embodiments of the present disclosure;

FIG. 2C shows another view of example directions of acceleration in accordance with some embodiments of the present disclosure;

FIG. 11 shows another example process in accordance with some embodiments of the present disclosure.

DETAILED DESCRIPTION OF THE DRAWINGS

Figure 3:
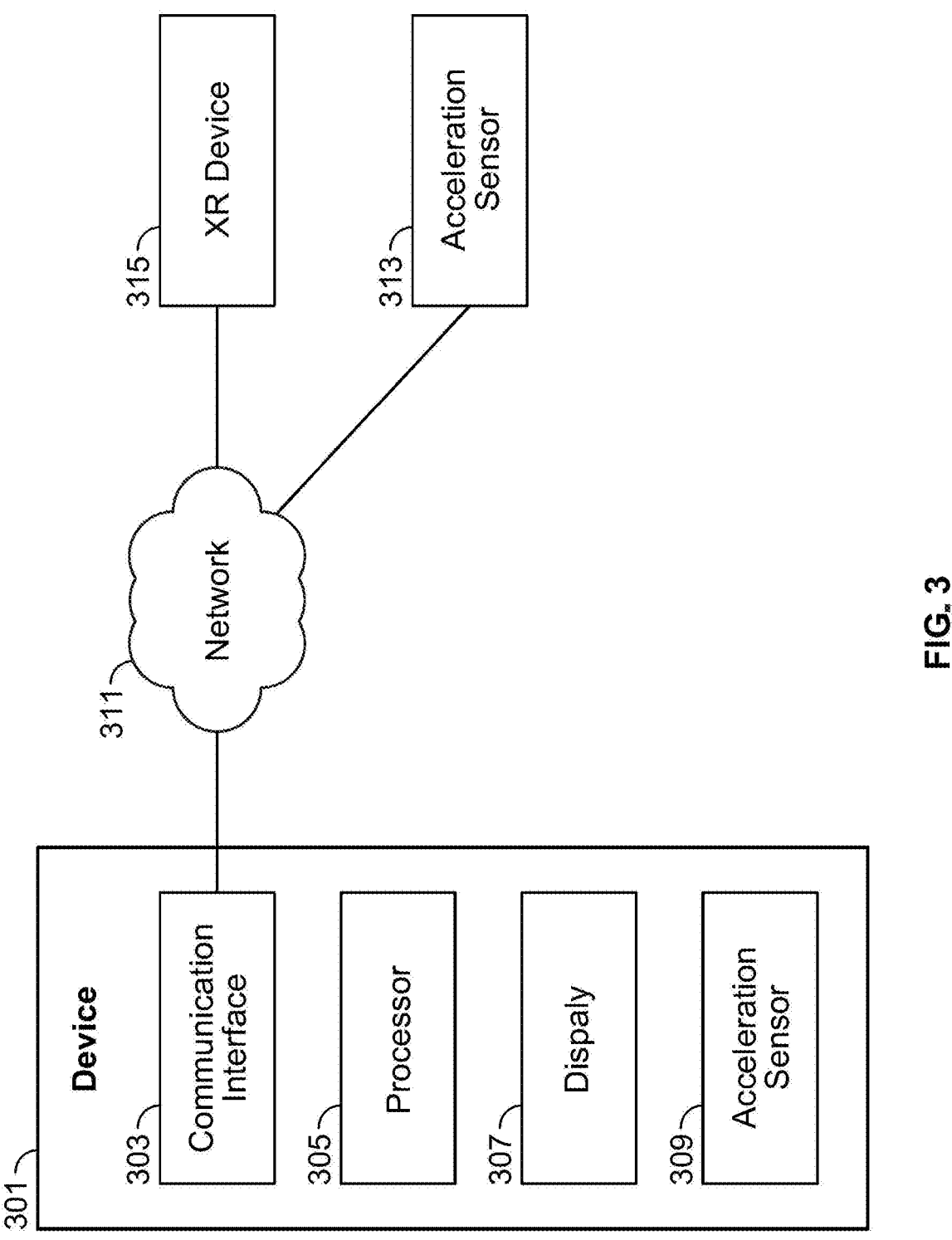
FIG. 3 shows an example architecture of some embodiments of the present disclosure.

The present system is directed to management of symptoms of motion sickness and more particularly to using overlay techniques to create visual cues of acceleration that match vestibular cues of acceleration. Generally speaking, existing techniques for visual cues to reduce motion sickness reduce detected three-dimensional acceleration to two dimensions and require screen space on a display. The systems and methods of the present disclosure address the causes of motion sickness to provide visual cues of acceleration in three dimensions without sacrificing display space.

FIG. 1 shows an illustrated embodiment of an overlay system 100 in which a passenger consumes content 120 provided by a device 121 while in a moving vehicle 150, and in which one or more steps 104-106 may be implemented to alleviate motion sickness by way of reducing, eliminating, or preventing mismatches between senses of the passenger's vestibular and ocular systems. The steps 104-106 may be implemented, in whole or in part, by control circuitry of the device 121 (or by control circuitry of one or more systems or devices in communication with the device 121). For example, the control circuitry associated with the device 121 may execute one or more instructions or routines stored to memory or storage to implement the steps 104-106. Generally, the content 120 may be any media or multimedia information that may be transmitted, received, stored, or output (e.g., displayed) in a manner consistent with the described techniques (e.g., output by the device 121). The content 120 may be or include media such as text (e.g., raw text or hyperlinks), audio (e.g., speech or music), image(s), video(s), or 3D renderings (e.g., rendered from scene data). In some embodiments, the content 120 may be or include interactive media or multimedia that enables a user to control or manipulate the way the interactive media or multimedia is presented (e.g., web pages, video games, interactive guides, or menus).

In any event, the overlay system 100 may be useful in numerous scenarios. For example, the overlay system 100 may, in some embodiments, reduce or prevent motion sickness on a train, plane, boat, or any moving and accelerating scenario. The overlay system 100 may also prevent motion sickness when the passenger, or other individual for embodiments in which the user is not in a vehicle, is participating in activities other than reading. For example, the overlay system 100 might help with motion sickness when an individual is watching a movie, texting a friend, or taking notes. Overlay system 100 may reduce motion sickness in scenarios where the individual's gaze is fixed, such as when a passenger in a vehicle reads, or mostly fixed, such as when a passenger in a vehicle plays a game on a smartphone.

In another example, overlay system 100 may reduce or prevent motion sickness when a user scrolls through social media or other content 120 on a smartphone while riding in a moving vehicle 150 as seen in FIG. 1. When the vehicle 150 accelerates at step 102, the vestibular system of a passenger who is reading on a screen of the device 121 senses the motion. However, the vision of this reading passenger tells the passenger that he or she is still, or perhaps accelerating slowly forward in the case of scrolling, because that is what the passenger sees on the display. This discrepancy between what the passenger's ocular system sense versus what the passenger's vestibular system signals to him causes the passenger to feel sick, as illustrated in step 103. The passenger may then either stop reading or try to improve their symptoms.

In some embodiments, an overlay is presented on the screen of a device (e.g., the device 121) to reduce or eliminate discrepancies between a passenger's vestibular and ocular systems. An overlay may be, for example, an image or animation displayed on top of other content on a display (e.g., on top of the content 120). The overlay in some embodiments comprises transparent figures or objects, such as balls, on the screen. The figures move with the acceleration of the vehicle, mimicking a view of the acceleration and thereby providing visual cues of acceleration that correspond to the acceleration sensed by way of the vestibular system. The figures may be guided by processing circuitry using data from acceleration sensors. The transparency of the overlaid figures or objects allows the display to show other content such as content 120 at the same time and causes the system to require no additional screen space. The user may continue reading or otherwise consuming content on the device without interruption. The user may continue using the device without receiving conflicting information regarding acceleration in three dimensions from the vestibular and vision systems, allowing the user to use the device without feeling motion sick.

In a still vehicle 150, or other vehicle such as a train, boat, or airplane, passengers are able to watch videos, read a map, write directions, or participate in other activities without incident. Such a situation is shown at step 101 where vehicle 150 does not accelerate. Passengers are able to read, or participate in other activities, without feeling motion sick. For example, step 101 shows a passenger using a smartphone. At step 102 the vehicle 150 begins to accelerate. When the vehicle 150 speeds up or slows down, a passenger in some embodiments detects this acceleration both visually and through the passenger's inner ear, or vestibular system, which translates interpretation of movements by way of acceleration to maintain a passenger's balance.

In an approach, when the vehicle 150 accelerates, the vestibular system of a passenger who is using the smartphone senses the motion. However, the field of view of this passenger, that is the view of the smartphone display, tells the passenger that he or she is still, or otherwise moving in the direction of the display of the smartphone. This discrepancy between the senses of the passenger's vestibular system and the senses of the passenger's ocular system causes the passenger to feel sick as illustrated in step 103. The passenger may then either stop using the smartphone or try to improve their symptoms.

In an approach, the overlay system 100 may implement steps 104-106 to reduce, eliminate, or prevent discrepancies between senses of the vestibular and ocular systems by way of displaying an animated overlay 110, thereby mitigating or preventing motion sickness that might be caused by such discrepancies. This overlay 110 creates a visual cue of acceleration to a person, for example specifically in the example of FIG. 1 a passenger, which aligns with the acceleration the person's vestibular system detects. The overlay 110 is able to mimic acceleration in three dimensions using two-dimensional animations which suggest depth in addition to width and height. Animations of depth, in addition to, in some embodiments, animations horizontal and vertical on the screen of the display, create an appearance of acceleration in three dimensions. This acceleration aligns with the three-dimensional acceleration a vestibular system senses. By aligning information the vestibular system senses with acceleration detected by the eyes, through visual cues from animations on the display of the device, the overlay system 100 of the present disclosure is able to reduce or prevent motion sickness.

At step 104, as vehicle 150 accelerates, the overlay system 100 detects acceleration using acceleration sensors (e.g., IMU(s) or inertial measurement unit or units), integrated into one or more devices or components of the overlay system 100. Acceleration sensors may be embedded in the device 121, the vehicle 150, or elsewhere. The acceleration sensors in some embodiments collect data regarding acceleration and report this data to overlay system 100 through for example a wired or wired link. The acceleration sensors may provide to the overlay system 100 an acceleration data stream, which is a continuous or ongoing flow of acceleration data. Based on the received acceleration data overlay system 100 determines a vector in three dimensions that represents the detected acceleration in some embodiments. Overlay system 100 then, in some embodiments, using data from one or more acceleration sensors and/or the determined acceleration vector, calculates the appropriate adjustments to an overlay 110 that will create visual cues matching the detected acceleration. For example, the overlay system may calculate an intensity, size, positioning, acceleration on the display, or other parameters that when applied to the overlay 110 create an illusion of acceleration of the same vector as that detected, such as an animation of an object moving in equal and opposite direction and rate. Calculations may in some embodiments consider the angle of the device such that the acceleration is oriented properly to display the same acceleration despite a display's angle to the floor or other position. In some embodiments calculations consider size and distance of overlay objects that depict the acceleration. In some embodiments the overlay system 100 does not display the overlay 110 until overlay system 100 detects a threshold acceleration. In some embodiments an overlay 110 is present before system 100 detects acceleration. In some embodiments overlay 110 is an animation that moves continually with detect acceleration.

Once overlay system 100 determines adjustments to, or animation of, overlay 110, it directs the display to enact the adjustments or animations as seen in step 105a. Example adjustments or animations are discussed with reference to example overlays shown in FIGS. 4-8.

In some embodiments, the content 120 and overlay 110 may be displayed via distinct devices. For example, a device other than the device 121, such as an XR device, may display the overlay 110 (or another overlay similarly designed to visually signal acceleration or movement having a component normal to the display of the relevant device), as seen in step 105b, while the device 121 display the content 120.

In some embodiments, following one of step 105a or 105b, or a combination thereof, at step 106, the vestibular system and vision of passenger sense the same or similar acceleration and as a result the passenger does not feel motion sick. The passenger is able to read, or participate in other activities, comfortably without feeling ill.

FIG. 2A shows an example vestibular system 201 of an individual which may sense acceleration with which an individual's visual sense of acceleration may be aligned using visual cues, objects, or animations provided by the described systems (e.g., the overlay system 100), thereby preventing or mitigating discrepancies between the individual's vestibular and ocular systems and thereby preventing or mitigating motion sickness attributable to such discrepancies. As noted, a passenger, or individual, may perceive acceleration partially using the inner ear or vestibular system 201 seen in FIG. 2A. The vestibular system 201 is a complex collection of mechanical sensors that detect both angular and linear acceleration shown in FIG. 2B. As seen in FIG. 2B, angular or rotational acceleration may be understood as acceleration of any of three angles of orientation: (i) roll (rotation around a longitudinal or x axis), (ii) pitch (rotation around a lateral or y axis), and (iii) yaw (rotation around a vertical or z axis). FIG. 2C illustrates angular accelerations (2C-1-2C3) and linear acceleration (2C-4) from the perspective of two dimensions. Example 2C-1 demonstrates pitch acceleration. Example 2C-2 demonstrates roll acceleration. Example 2C-3 demonstrates yaw acceleration. Example 2C-4 demonstrates linear acceleration (which may occur forward/backward along a longitudinal axis, side-to-side along a lateral axis, or up/down along a vertical axis).

In addition to inner-ear cues of acceleration sensed via the vestibular system 201, passengers or individuals also receive visual cues about acceleration. Seeing surroundings move indicates to the passenger that he or she is accelerating.

However in some scenarios visual perception of acceleration does not align with a passenger's vestibular perception of acceleration. For example, one system of the passenger's body (visual or vestibular) may detect acceleration (e.g., linear or angular) while the other does not. For example, when reading in vehicle 150, a passenger will not see motion. The passenger's eyes will be focused on the page in front of the passenger and the passenger will not see, for example, the view of a nearby window in which the surroundings of the passenger are moving. The passenger will only see a still page. However, in this scenario, the vestibular system of the passenger will detect acceleration because the passenger is physically accelerating inside of a moving vehicle that changes speed continuously. The mismatch of information, information from the eyes that the passenger is not accelerating and information from the vestibular system that the passenger is accelerating, will cause the passenger to feel motion sick. Described systems, such as the overlay system 100, may act on a passenger's—or other individual's—visual system through overlays 110 to display visual cues of actual acceleration on an otherwise mismatching display, thereby aligning visual information with vestibular information. By aligning acceleration sensed by way of the vestibular and ocular systems, the described systems can prevent, reduce, or eliminate motion sickness attributable to mismatches between senses of the vestibular and ocular systems FIG. 3 shows an example system architecture 300 of overlay system 100 illustrating the relationship, interactions, and connections between the different components. Overlay system 100 may include a device 301 having a display 307. The device 301 may be similar to the device 121 shown in FIG. 1 and may implement the same or similar functionality as that attributed to the device 121. The device 301 may be any number of devices including a smartphone, tablet, or in vehicle entertainment center. In some embodiments the device 301 is a vehicle 150, or a computing device or system of the vehicle 150 (e.g., a "ucarputer"), where display 307 is a display integrated with the vehicle dashboard or console, or an in-seat display, for example. In some embodiments, the device 301 is a vehicle and display 307 is an entertainment or infotainment system. In some embodiments device 301 is an XR head-mounted display (HMD). Device 301 may include a communication interface 303 for sending and receiving information, a processor 305 for processing data and acceleration sensor 309 that detects acceleration. Additional acceleration sensors 313 may also be in communication with processor 305. The additional acceleration sensors 313 may receive acceleration data regarding acceleration of a user, vehicle, or any other object. For example, acceleration sensor 313 in some embodiments may be an IMU attached to vehicle 150 which detects acceleration of vehicle 150. Overlay system 100 may include an extended reality (XR) device 315 such as an XR HMD (e.g., a virtual reality (VR) HMD or an augmented reality (AR) display). References herein to an "XR device" or "XR HMD" refer to a device providing virtual reality (VR), mixed or merged reality (MR), or augmented reality (AR) functionality (e.g., wherein virtual objects or graphic overlays are provided in addition to real-world objects or environments visible via the device). An XR device may take the form of HMD. As discussed below an XR device may display an overlay in some embodiments over content displayed by the display 307. Device 301, through communication interface 303, may connect with acceleration sensor 313 and XR device 315 via a network 311. Network 311 may be any network capable of facilitating communication between devices or components such as a wireless or wired internet or intranet connection, Bluetooth, or other link.

Figures 4A, 4B:
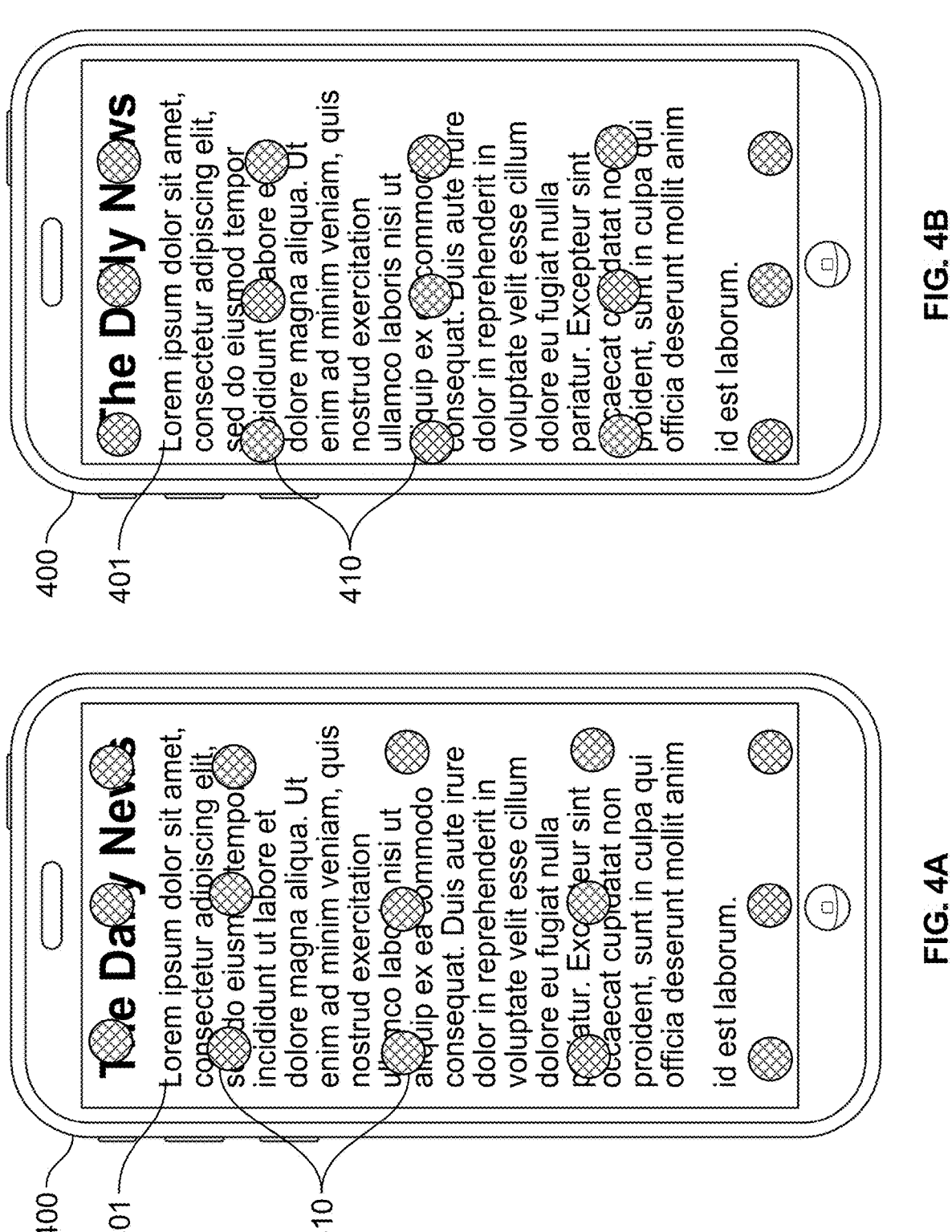
FIG. 4A shows an example overlay in one position in accordance with some embodiments of the present disclosure.
FIG. 4B shows an example overlay in a second position in accordance with some embodiments of the present disclosure.

FIGS. 4A and 4B show an example overlay 110 animation of the present disclosure. FIG. 4A shows a screen of a device 400, akin to device 301, displaying content 401. Over content 401 the screen displays an overlay of objects 410 arranged in a grid pattern. In FIGS. 4A and 4B objects 410 are circles, although objects may be any number of shapes or representations, as seen in other embodiments below. In FIG. 4A the objects 410 are in a neutral position. The overlay system 100 detects acceleration, as discussed above and described in more detail below, and animates objects 410 to depict acceleration in the same or similar direction, magnitude, and rate as the detected acceleration, or in some embodiments with the same acceleration vector, to reflect the detected acceleration as a visual cue. For example, in some embodiments overlay system 100 represents the detected acceleration as a vector that the overlay system 100 calculates. The overlay system 100 then determines, using on the calculated vector, animation of objects 410 to match the detected acceleration For example, FIG. 4B shows the objects 410 of FIG. 4A shifted to the left after the device 400 experiences acceleration in the left direction. For example, in this illustrated embodiment, the overlay system 100 has determined that the detected leftward acceleration correlates to objects 410 moving to the left of the display of device 400. In some embodiments this correlation may be calculated based on movements of an overlay 110 or objects 410 that overlay system 100 determines would result if the overlay 110 or objects 410 as real-life objects experience the detected acceleration as the calculated acceleration vector. The animation provides a visual cue to a viewer that the viewer is experiencing acceleration. Unlike visual cues coming from content item 401, which is still, thereby signaling no acceleration, the visual cues of the animation match acceleration a user's vestibular system detects. This match reduces or prevents motion sickness for the viewer.

In some embodiments the objects 410 of FIG. 4B may suggest three-dimensional acceleration that includes an acceleration component normal to the screen of the display of the device 400. In such some embodiments, the objects 410, for example, may appear to become smaller or larger with the distances between them also shrinking or expanding accordingly. In some examples, the objects 410 may appear to accelerate in a direction and rate that is equal and opposite to those of the perceived acceleration and this acceleration of the object 410 creates a simulation in the visual system of a viewer matching the acceleration the viewer's vestibular system perceives. This change in size may suggest to a user that the user is moving farther away (when the objects 410 become smaller and closer together) or closer (when the objects 419 become larger are farther from one another) to mimic acceleration normal the display of device 400.

In some embodiments, the overlay 110 is limited to a region or multiple regions of the display 307 such as in the black bars presented above and below movies with an aspect ratio that doesn't match the screen. The user may adjust the size and location of selected regions in some embodiments. In some embodiments, other visual effects are applied to the display 307 (e.g., deformation of the display in the direction opposite perceived acceleration), rather than the dedicated overlay 110. In some embodiments, overlay system 100 applies pan and zoom effects rather than, or in addition to, the animated overlay 110. For example, zooming in corresponds to forward acceleration, and zooming out corresponds to deceleration. Panning corresponds to sideways acceleration. A black border can be presented around the screen content while zooming out or panning in some embodiments. In some embodiments, the overlay system 100 determines the average, dominant, or most common color on the display 307 and adjusts the color of the overlay 110 to ensure contrast. In some embodiments, portions of overlay 110 become more salient as they move away from the center of the display 307. This change could occur suddenly, as each cue leaves the content area, or gradually as a function of visual eccentricity.

Figures 5A, 5B:
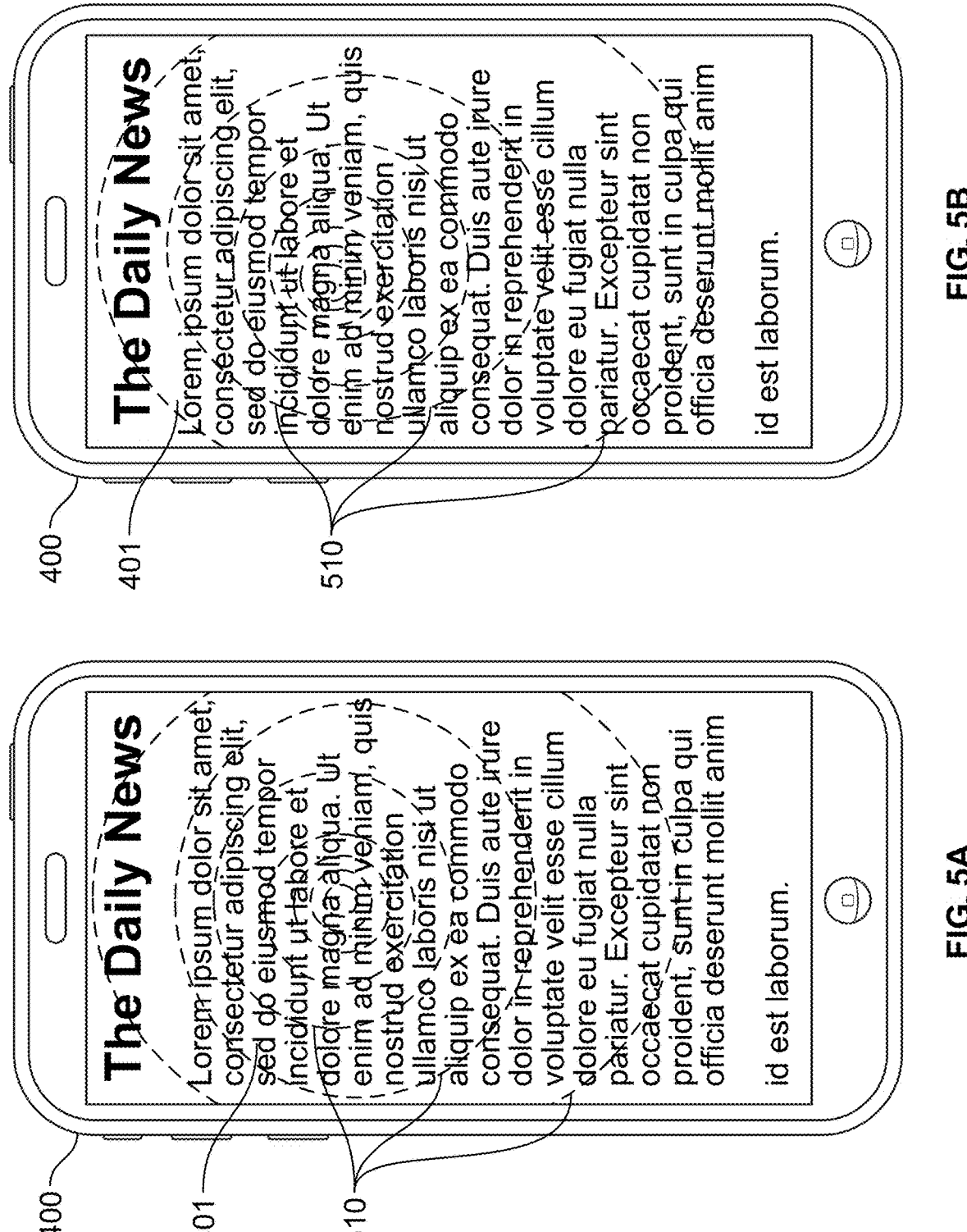
FIG. 5A shows an example overlay in one position in accordance with some embodiments of the present disclosure.
FIG. 5B shows an example overlay in a second position in accordance with some embodiments of the present disclosure.

FIGS. 5A and 5B show some embodiments of the overlay system 100 that includes an overlay 110 with concentric circles 510 as objects 410 and in which a direction normal to the plane defined by the display of device 400 is represented. Such some embodiments is an example illustration of an overlay 110 that may reduce or prevent motion sickness when, for example, displayed over a content item 120. When the overlay system 100 detects acceleration, it determines a detected acceleration vector and animates circles 510 to move in accordance with the determined acceleration vector. In some embodiments, the center or innermost circle follows the detected acceleration vector and each circle around the center circle moves with the center circle. The circles 510 may through animation become smaller and larger as well. The displayed acceleration on the display and change in size creates a tunnel effect mimicking movement through, or normal to, the screen of the device 400. Overlay system 100 may use such an effect when it detects acceleration with a vector component normal the plane defined by the display of device 400 to ensure that the visual cues concentric circles 510 provide closely represent the acceleration vector. A second, more intense example of the tunnel effect is shown in FIGS. 6A and 6*b*.

FIG. 5A shows the overlay before overlay system 100 detects acceleration. In some embodiments, the device 400 does not show an overlay until system 100 detects acceleration. FIG. 5B shows the concentric circles 510 moving on the display of device 400 after overlay system 100 detects slight acceleration with vector components in the vertical, horizontal, and normal directions. The movement of the concentric circles 510 left and up on the display of device 400 mimic acceleration within the plane defined by the display. Changes to the sizes of circles 510 mimic acceleration normal to the plane defined by the display as they create an illusion of outward or inward motion as the circles 510 appear to accelerate towards or away from the viewer. This animation provides visual cues of three-dimensional acceleration. The visual cues of the animation in three dimensions match the acceleration a user's vestibular system detects. This match reduces or prevents motion sickness for the viewer.

Figures 6A, 6B:
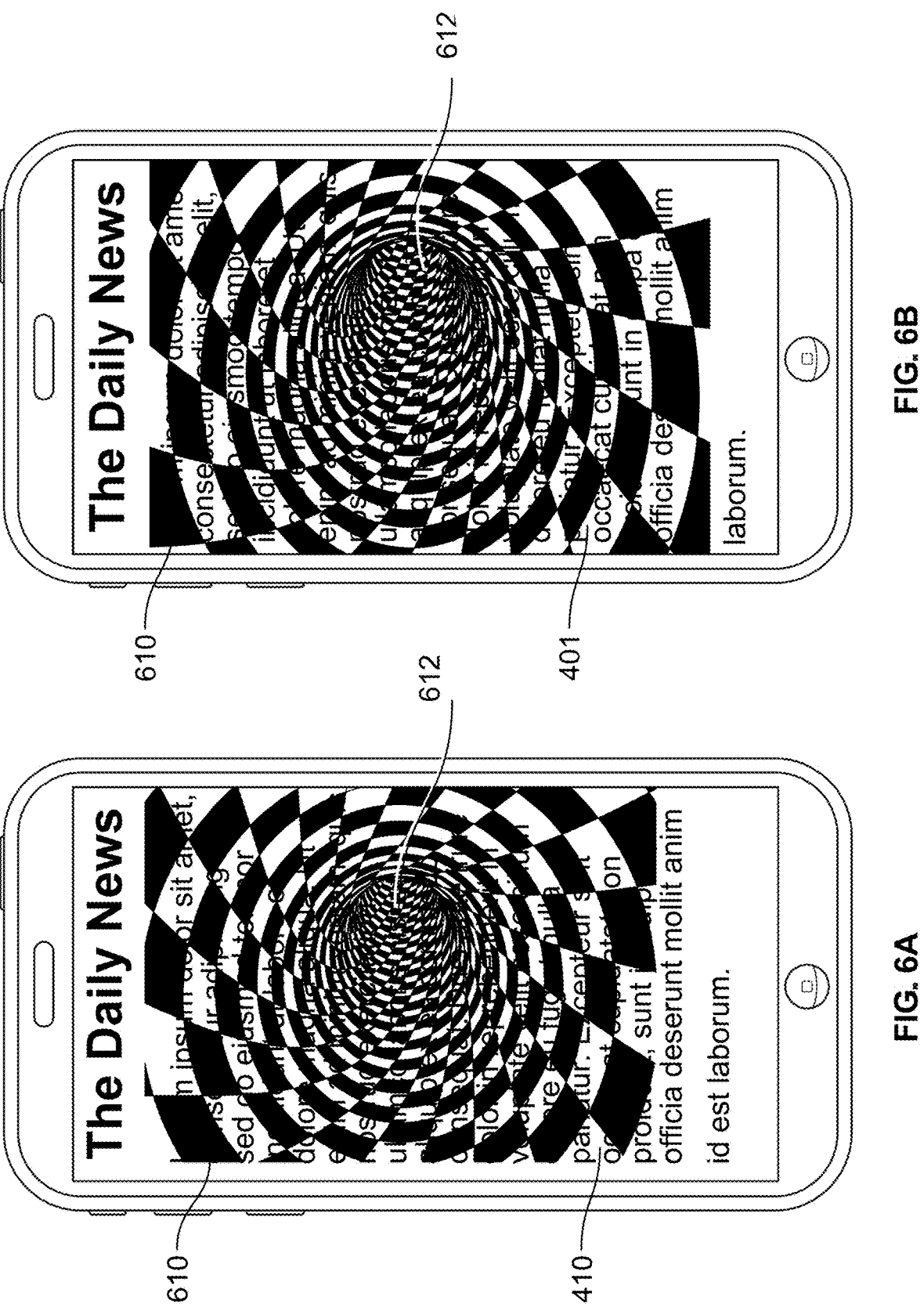
FIG. 6A shows an example overlay in one position in accordance with some embodiments of the present disclosure.
FIG. 6B shows an example overlay in a second position in accordance with some embodiments of the present disclosure.

FIGS. 6A and 6B show an overlay 110 with a tunnel effect in which the concentric circles comprise a checkerboard pattern 610. Such some embodiments is an example illustration of an overlay 110 that may reduce or prevent motion sickness when, for example, displayed over a content item 120. At the center the concentric circles become smaller, reaching a vanishing point 612. The tunnel effect shown in these figures is two-dimensional but appears three-dimensional due to the animation simulating depth. The concentric circles and checkers 610 move up, down, left, right, toward the vanishing point 612, and away from the vanishing point 612 to reflect the determined acceleration vector in some embodiments to create visual cues of acceleration. In some embodiments the concentric circles and checkers 610 continually become smaller or larger, and appear to move towards or away from the vanishing point 612, to create an appearance that a viewer is moving into or out of the tunnel.

In some embodiments the checkers 610 are translucent and transposed over a content item such as content 401. Because the checkers 610 in that embodiment are translucent, a user is able to view content 401 although checkers 610 are overlayed on top of it.

Figures 7A, 7B:
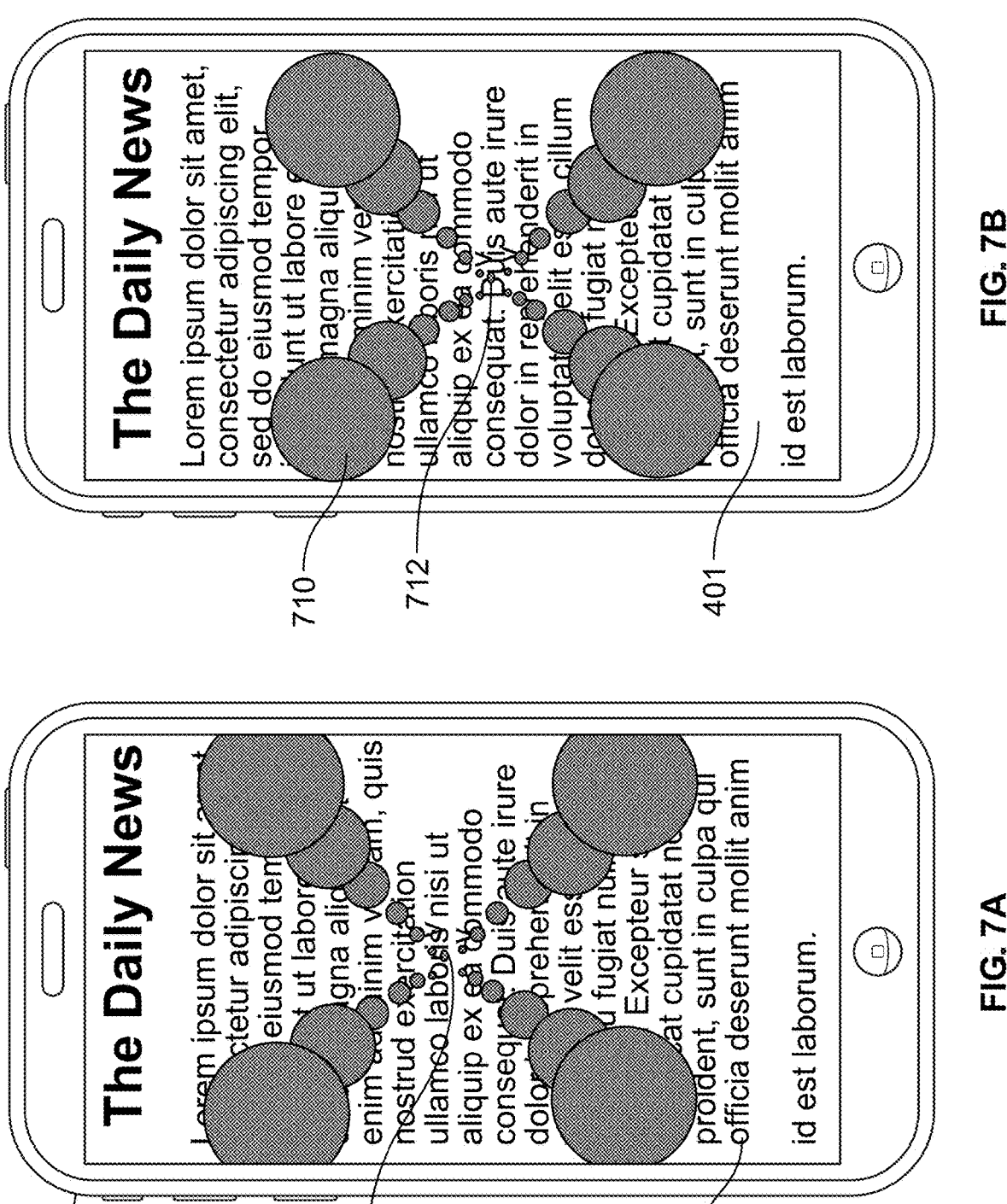
FIG. 7A shows an example overlay in one position in accordance with some embodiments of the present disclosure.
FIG. 7B shows an example overlay in a second position in accordance with some embodiments of the present disclosure.

FIGS. 7A and 7B show some embodiments of an overlay 110 of overlay system 100. Such some embodiments is an example illustration of an overlay 110 that may reduce or prevent motion sickness when, for example, displayed over a content item 120. In FIG. 7A are a series of circles 710 in descending order according to size and in which each larger circle overlaps on top of the smaller circle before it. The circles 710 are transposed on top of content 401. In FIG. 7A the circles 710 become smaller, eventually reaching vanishing point 712. This illustration appears to be a series of circles or balls in three dimensions in which the largest circles 710 are closest to the viewer and smaller circles 710 are farther. In some embodiments circles 710 appear to react to detected acceleration when overlay system 100 animates them to accelerate according to the acceleration vector the overlay system 100 calculated. For example, circles may become larger or smaller to appear to move toward or away from the vanishing point 712 as seen in FIG. 7B. The adjustment of the circles 710 gives a visual cue of acceleration normal to the plane of the display. In some embodiments the circles 710 may also move horizontally and vertically on the display to reflect detected acceleration in other directions and more fully reflect a three-dimensional acceleration vector.

Figures 8A, 8B:
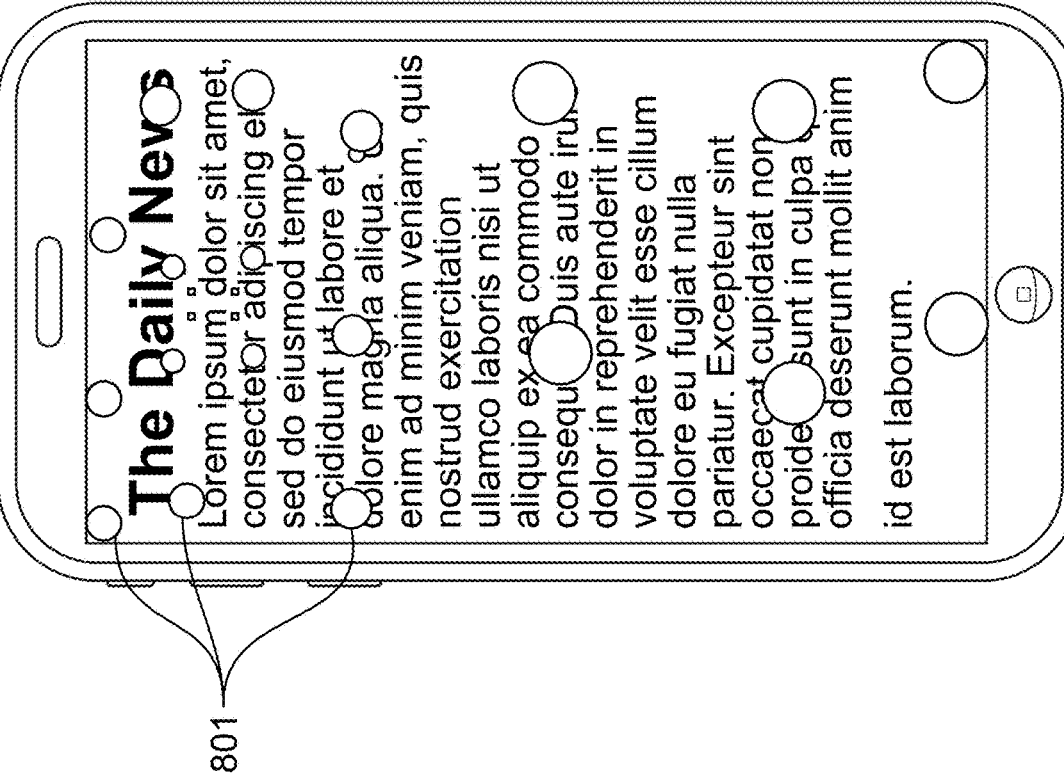
FIG. 8A shows an example overlay in one position in accordance with some embodiments of the present disclosure.
FIG. 8B shows an example overlay in a second position in accordance with some embodiments of the present disclosure.

FIGS. 8A and 8B show some embodiments of an overlay 110 of overlay system 100 that may reduce or prevent motion sickness when, for example, displayed over a content item 120. The overlay 110 of these figures comprises circles 801 which may be translucent or opaque. As the overlay system detects acceleration, the circles 801 change in size, location, and distance from one another. For example FIG. 8A shows circles 801 in one position. After the overlay system 100 detects acceleration and, in some embodiments, determines an acceleration vector, it adjusts circles 801, animating them such that they reach the positions shown in FIG. 8B. These changes in size, position, and distance, create an illusion that a viewer is accelerating in a direction, comprising a combination of directions horizontal, vertical, and normal to a plane defined by the display of the device, although the animation is rendered on a two-dimensional screen. This animation provides visual cues of acceleration in three dimensions.

Figure 9:
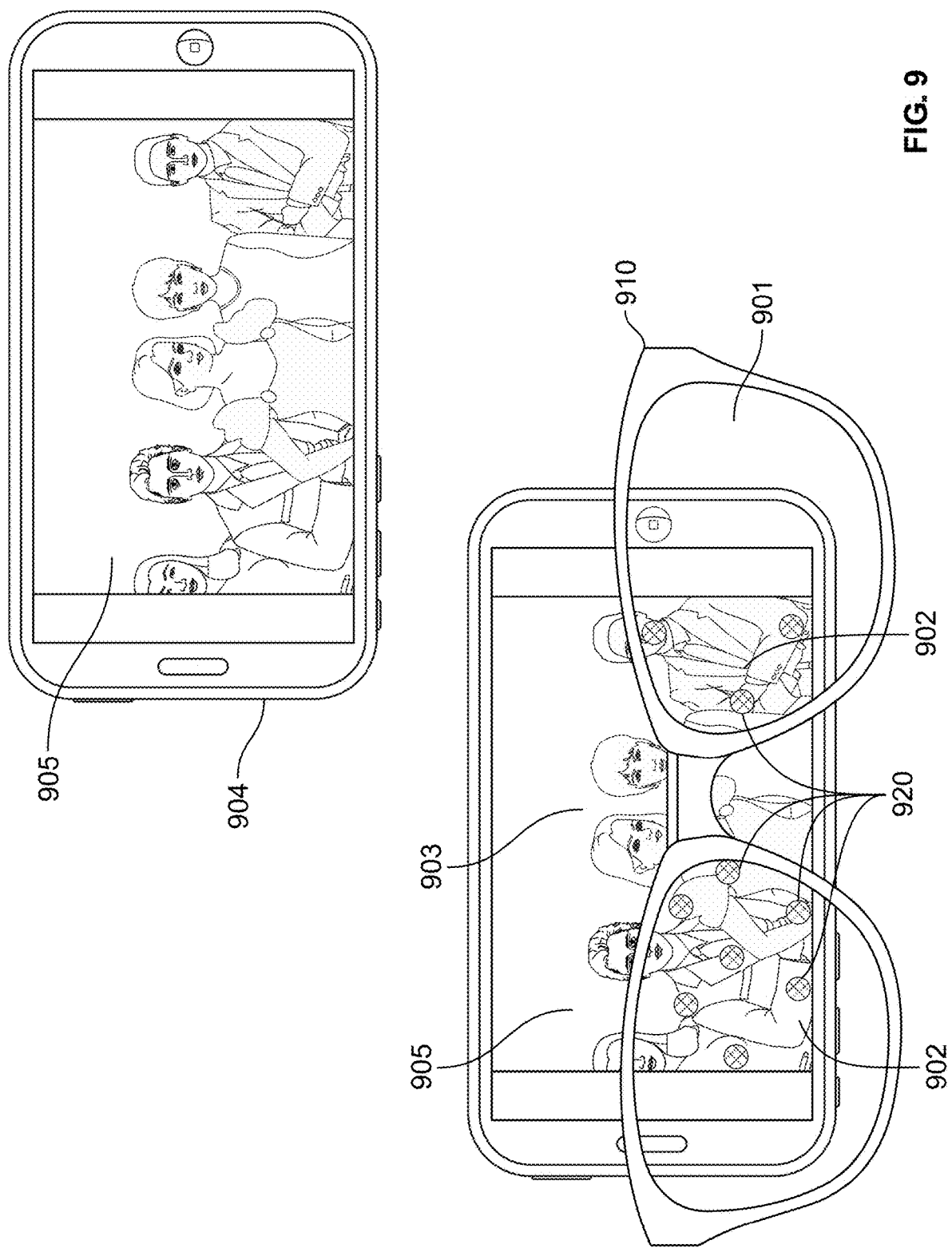
FIG. 9 shows an example overlay displayed on a second device in accordance with some embodiments of the present disclosure.

FIG. 9 shows some embodiments in which a device (such as XR HMD 910), different than the device 310 displaying the content 905, displays an overlay 920 onto device 310. The embodiment is an example of implementing overlay system 100 with multiple devices. The embodiment may display any number of overlays 110, such as those discussed above. The overlay 110 the XR HMD displays may help reduce or prevent motion sickness when a user views the overlay, for example, over a still content item 120. The embodiment of FIG. 9 shows XR HMD 910. Region 901 shows the region in which the XR HMD 910 are out of line with the device 310. That is, region 901 is a portion of the view through XR HMD 910 that does not include a view of device 310. Region 901 does not include the overlay 920 because device 301 is not visible in that region. In contrast, region 902 includes a view of device 301 and content 905 and the overlay 920 is visible in region 902 as a result. In region 902 the overlay 920 is on top of content 905, the content displayed on the screen of device 301 in FIG. 9. Region 903 is a portion of device 301 not visible by any region of XR HMD 910. Because XR HMD produce the overlay 920 in this embodiment, the overlay 920 is not present in region 903. Similarly, view 904, a view of device 301 when XR HMD 910 are removed entirely, or for example, the view from a user without access to XR HMD 910, shows device 301 without the overlay 920, although content 905 is still available. In some embodiments a device such as XR HMD 910, or in some embodiments, a projector, may display the overlay 920 onto a surface other than device 310. For example a device may display the overlay 920 onto any surface inside the vehicle, such as the floor or a window. The overlay 920 and processes associated with overlay 920, such as that of FIG. 1, may function the same way despite the fact that device 310 does not produce the overlay 920. In some embodiments, overlay system 100 displays the overlay 920 in areas of the view of the XR HMD that do not overlap with content 905. In some embodiments, the overlay system 100 presents motion cues on a separate dedicated device. For example, a car manufacturer may provide a simple tablet meant to lay behind content (e.g., a book) to provide peripheral motion cues.

In some embodiments, if the overlay system 100 is capable of displaying anchored XR content, and may generate an image of a window that displays visual cues of acceleration. References herein to an "XR content" refer to virtual reality (VR), mixed or merged reality (MR), or augmented reality (AR) content (e.g., wherein virtual objects or graphic overlays are provided in addition to real-world objects or environments visible on a device). "Anchored XR content" refers to content displayed in XR that maintains a position, for example a position relative to real-world objects, despite changes in position of the user viewing the content, the device displaying the content, or other variables. In one example of anchored XR content, XR HMD display an object in a viewer's real-world view of a landscape outside of a window. Despite the viewer's movements and/or relocation relative to the landscape, the object appears to remain in one position relative to the landscape. In this example, the viewer perceives that the object is not moving and is a static element of the surrounding landscape. In some embodiments of the overlay system 100, a user wearing XR HMD and looking down at his or her phone may see an XR transparent panel on the floor of the vehicle 150 that shows an overlay 110 or other image reflecting a determined acceleration vector. Similarly, if the user is in the back seat of a vehicle 150 he or she may see an image of a window on the back of a front seat showing an overlay 110 or other acceleration cues.

Figure 10:
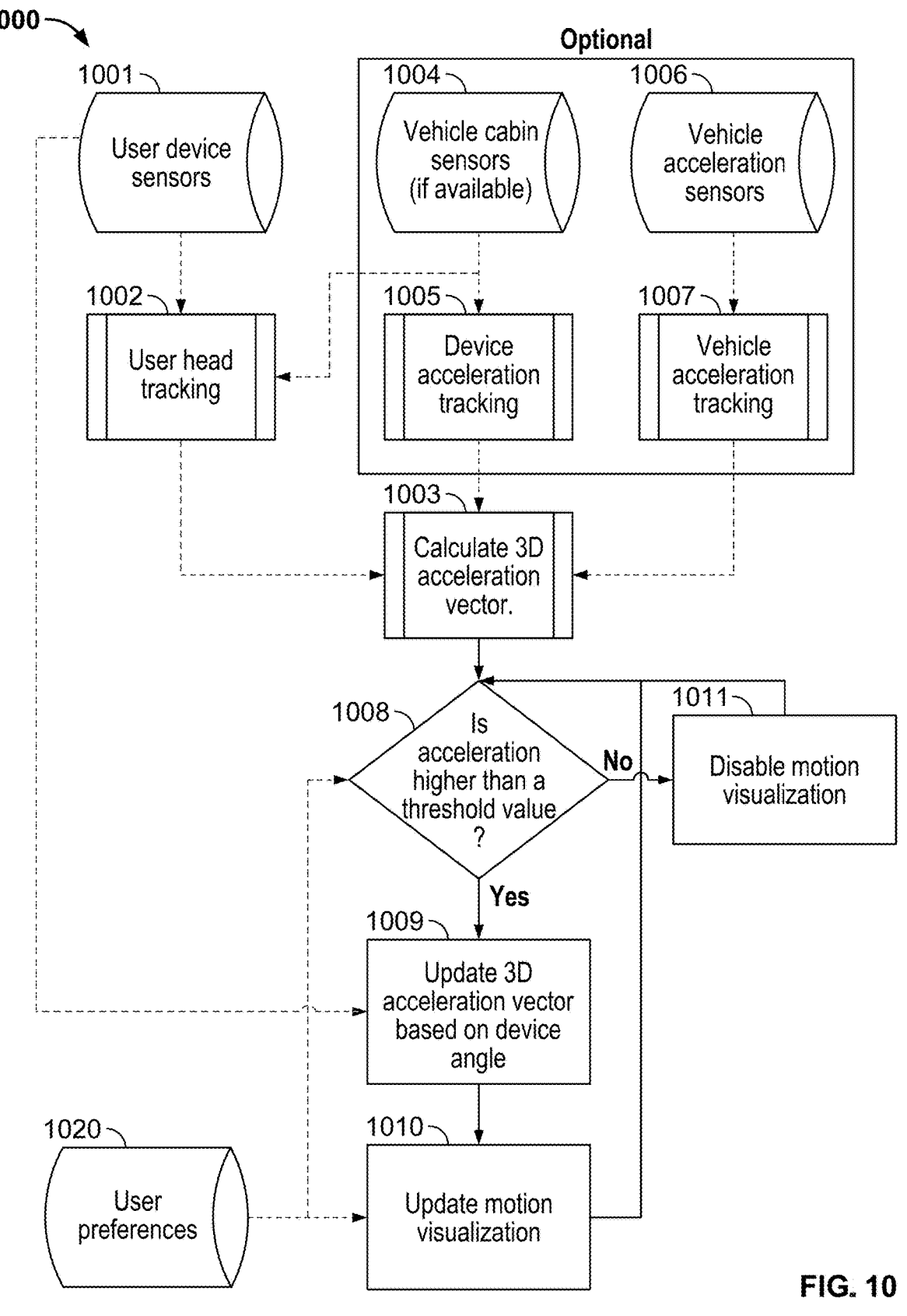
FIG. 10 shows an example process in accordance with some embodiments of the present disclosure.

FIG. 10 shows a flowchart illustrating a process 1000 of some embodiments of the present disclosure, explaining an example execution and additional details of overlay system 100. The process 1000 may be implemented, in whole or in part, by control circuitry including for example, processor 305 of overlay system 100. For example, one or more of the aforementioned systems or devices, such as device 301, may execute one or more instructions or routines stored to memory or storage of a device to implement, in whole or in part, the process 1000. At step 1001 user device sensors, such as acceleration sensor 309, connected to for example device 301 collect information about acceleration of device 301, vehicle 150, or other relevant detected acceleration. In some embodiments the overlay system 100 uses the acceleration data collected at step 1001 to determine at step 1002, via for example processor 305, a location of a user's head as well. In some embodiments overlay system 100 uses front facing cameras on for example a smartphone to track a user's head. Overlay system 100 and processor 305 may further received data from, for example, an object recognition sensor to determine the location of a user's head at this step. At step 1003 the overlay system 100 calculates using for example processor 305 a three-dimensional acceleration vector using information collected at steps 1001 and 1002, the three-dimensional acceleration vector representing the detected actual acceleration. Some embodiments further include additional optional elements as well. For example, some embodiments include vehicle cabin sensors that overlay system 100 uses to determine vehicle cabin acceleration at step 1004. Some embodiments include device acceleration tracking which system 100 uses at step 1005 to track the acceleration of the device 301 in addition to user device sensors. The overlay system 100 may use data it collects from vehicle cabin sensors at step 1004 in steps 1002 and 1005. Some embodiments may also include vehicle acceleration sensors which the overlay system 100 uses to detect the vehicle's, such as vehicle 150, acceleration at step 1006. The overlay system 100 may use information received in step 1006 to track the vehicle at step 1007. The overlay system 100 may further use information from both step 1006 and 1007 to calculate the three-dimensional acceleration vector at step 1003.

At step 1008 the overlay system 100, using the calculated three-dimensional acceleration vector determines, for example via processor 305, that an acceleration is detected and whether the acceleration is higher than a threshold value. In some embodiments the threshold value is a given threshold value. In some embodiments the threshold is an adaptable threshold. In some embodiments the threshold is determined at least partly based on user preferences 1020. In some embodiments, the overlay system 100 receives data regarding a user's detected level of motion sickness and adjusts either the overlay 110 intensity or acceleration threshold in response, to prevent more salient cues. Motion sickness can be estimated from a variety of biomarkers, including eye blink rate, heart rate variability, EEG brain activity, and photoplethysmography (PPG) such as in the Apple Watch or similar wearables. If at step 1008 the process determines that the detected acceleration is above a threshold value, the process 1000 moves to step 1009 in which overlay system 100 updates the three-dimensional acceleration vector based on the angle of the device. For example, the device in some embodiments may not be parallel to the plane in which the acceleration vector was detected and therefore the acceleration vector is translated for representation on a different plane. At step 1010 the overlay system 100 updates motion visualization, for example animation. Step 1010 may include animating the overlay 110 to reflect or mimic the acceleration vector detected at step 1003 such that a viewer feels, based on visual cues, that he or she is moving at the same acceleration. For example, an animation may depict an object accelerating according to a vector that is equal and opposite the acceleration vector. This animation provides a visual cue to the viewer that the viewer is moving according to the acceleration vector. Motion visualization at step 1010 may be at least in part based on stored user preferences 1020 which may indicate for example preferred effects, styles, translucency, spatial frequency, color, contrast, size, brightness or other parameters. For example, in some embodiments, users may adjust the intensity of the overlay 110 effect via a global slider. In some embodiments the overlay system 100 may update or direct the motion visualization to be directed to a viewer's head or eye gaze using information collected or determined at step 1002. For example, in embodiments including a vanishing point, such as those shown in FIGS. 5A and 5B, 6A and 6B, and 7A and 7B, the overlay system 100 may display the vanishing point in the center of the viewer's gaze. For example, overlay system 100 may in some embodiments diminish or disable overlay 110 in a region of eye gaze and instead rely on periphery or vice versa. In some embodiments, overlay system 100 can capture eye gaze from the front-facing camera on a smartphone, embedded eye trackers in XR glasses, or car-mounted cameras. If at step 1008 the process determines that the detected acceleration is not above a threshold value, the process 1000 moves to step 1011 in which the overlay system 100 disables motion visualization. The process then returns to step 1008 where the overlay system 100 determines if a next calculated acceleration vector meets the threshold value.

FIG. 11 shows an example process 1100 of an example embodiment of overlay system 100, explaining an example execution and additional details of overlay system 100. The process 1100 may be implemented, in whole or in part, by control circuitry including for example, processor 305 of overlay system 100. For example, one or more of the aforementioned systems or devices, such as 301, may execute one or more instructions or routines stored to memory or storage of a device to implement, in whole or in part, the process 1100. At step 1101 the overlay system 100 generates a content item such as content item 401 or 805 on a display of a device such as display 307 of device 301. A content item may be any media asset such as among others a webpage, email, text message, movie, social media page or ebook. Control circuitry of the device, such as processor 305, performs elements of the step 1101 in some embodiments. At step 1102 the overlay system 100 determines if acceleration of the device is detected. In some embodiments overlay system 100 including processor 305 performs step 1102 after receiving and processing acceleration data communicated from an acceleration sensor 309, such as acceleration sensor 309, which measures and communicates the acceleration of the device, such as device 301, in all three dimensions. In some embodiments at step 1102 overlay system 100 further incorporates data from additional acceleration sensors such as an acceleration sensor 313 measuring the acceleration of a vehicle 150. If acceleration is detected, at step 1103 the system 100 determines (using, for example, processor 305) a three-dimensional acceleration vector representing acceleration of the device and comprising a vector component normal to the plane defined by the display of the device. Then the process may move to step 1104 in which overlay system 100 displays an overlay 110, such as a graphical overlay, over the display of the content item. In some embodiments the overlay system 100 animates overlay 110 to appear to move in a direction normal to the plane defined by the display 307 of the device 301. In some embodiments the overlay system 100 animates overlay 110 to appear to move in other directions, such as directions horizontal or vertical on the plane defined by the display of the device, as well as animating the overlay 110 to appear to move in a direction normal to the plane defined by the display 307 of the device 301. In some embodiments the animations of overlay 110 and overlay 110 itself are two-dimensional despite their three-dimensional appearance. If at step 1102 the overlay system 100 determines that no device acceleration is detected the overlay system 100 in some embodiments displays no overlay 110 or makes no changes to an overlay 110 already displayed, and returns to detecting acceleration at step 1102.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in an embodiment may be applied to any other embodiment herein, and flow-charts or examples relating to an embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:
    generating for display, on a device comprising a display, a content item;
    determining an acceleration of the device along a vector, the vector comprising a vector component that is normal to a plane defined by the display; and
    generating for display a graphical overlay over the display of the content item, wherein the graphical overlay comprises a predefined geometric pattern that is animated to visually signal a direction defined by the vector comprising the vector component that is normal to the plane defined by the display.

2. The method of claim 1, wherein the graphical overlay comprises appearance of movement of at least one animated element in the direction defined by the vector comprising the vector component that is normal to the plane defined by the display.

3. The method of claim 1 wherein the geometric pattern is animated using a two-dimensional animation comprising an effect that simulates movement along an axis that comprises the vector component normal to the plane defined by the display and a second vector component that is parallel to the plane defined by the display.

4. The method of claim 1 wherein the geometric pattern comprises a plurality of figures arranged in a grid pattern and wherein a size of and a first distance between figures of the plurality of figures change to alter an impression of a second distance of at least a portion of the figures of the plurality of figures from the plane defined by the display.

5. The method of claim 1 wherein the geometric pattern is animated using an animation that comprises a vanishing point, wherein a location of the vanishing point is determined based on the determined acceleration.

6. The method of claim 5 wherein the location of the vanishing point changes dynamically based on the determined acceleration.

7. The method of claim 1 wherein the geometric pattern comprises a plurality of concentric circles, wherein animation of the geometric pattern comprises movement of each circle of the plurality of concentric circles synchronized with movement of an innermost circle of the plurality of concentric circles, and wherein the innermost circle moves according to the vector comprising the vector component that is normal to the plane defined by the display.

8. The method of claim 7 wherein each circle of the plurality of concentric circles is in the foreground compared to a last circle of the plurality of concentric circles each circle of the plurality of concentric circles encapsulates.

9. The method of claim 1 wherein the geometric pattern is animated in a color contrasting a dominant color on the display of the device.

10. The method of claim 1 further comprising:
tracking a position of a head of a user; and
modifying the graphical overlay to align with the tracked position of the head of the user.

11. The method of claim 1 further comprising:
tracking an eye gaze of a user; and
modifying the graphical overlay to align with the tracked eye gaze of the user.

12. The method of claim 1 wherein generating for display the graphical overlay is by an XR device and wherein the XR device is different than the device generating for display the content item.

13. A method comprising:
generating for display, on a device comprising a display, a content item;
determining an acceleration of the device in three dimensions; and
generating for display a graphical overlay over the display of the content item, wherein the graphical overlay comprises a predefined geometric pattern that is animated to visually signal animation in three dimensions defined by the determined acceleration of the device in three dimensions.

14. The method of claim 13, wherein the graphical overlay comprises appearance of movement of at least one animated element in the three dimensions defined by the determined acceleration of the device in three dimensions.

15. The method of claim 13, wherein the graphical overlay comprises appearance of movement of at least one animated element in a direction that is normal to a plane defined by the display.

16

16. A system comprising:
processing circuitry configured to:
generate for display, on a device comprising a display, a content item;
determine an acceleration of the device along a vector, the vector comprising a vector component that is normal to a plane defined by the display; and
generate for display a graphical overlay over the display of the content item, wherein the graphical overlay comprises a predefined geometric pattern that is animated to visually signal a direction defined by the vector comprising the vector component that is normal to the plane defined by the display.

17. The system of claim 16, wherein the graphical overlay comprises appearance of movement of at least one animated element in the direction defined by the vector comprising the vector component that is normal to the plane defined by the display.

18. The system of claim 16 wherein the geometric pattern is animated using a two-dimensional animation comprising an effect that simulates movement along an axis that comprises the vector component normal to the plane defined by the display and a second vector component that is parallel to the plane defined by the display.

19. The system of claim 16 wherein the geometric pattern is animated using an animation that comprises a vanishing point, wherein a location of the vanishing point is determined based on the determined acceleration.

20. The system of claim 16 wherein generating for display the graphical overlay is by an XR device and wherein the XR device is different than the device generating for display the content item.

* * * * *